United States Patent [19]
Florjancic

[11] 3,905,606
[45] Sept. 16, 1975

[54] SHAFT SEAL LIFT-OFF ARRANGEMENT
[75] Inventor: Dusan Florjancic, Winterthur, Switzerland
[73] Assignee: Klein, Schanzlin and Becker Aktiengesellschaft, Frankenthal, Germany
[22] Filed: Apr. 20, 1973
[21] Appl. No.: 353,135

[30] Foreign Application Priority Data
May 15, 1972 Germany.............................. 2222082

[52] U.S. Cl......................................... 277/27; 277/3
[51] Int. Cl.² ...................... F16J 15/34; F16J 15/16
[58] Field of Search.............................. 277/27, 3, 96

[56] References Cited
UNITED STATES PATENTS
| | | | |
|---|---|---|---|
| 2,814,512 | 11/1957 | Quinn et al. .............................. | 277/3 |
| 3,447,809 | 6/1969 | Marrujo et al. ....................... | 277/27 |
| 3,499,653 | 3/1970 | Gardner................................ | 277/27 |
| 3,529,838 | 9/1970 | Singleton .............................. | 277/27 |

FOREIGN PATENTS OR APPLICATIONS
| | | | |
|---|---|---|---|
| 1,650,061 | 9/1969 | Germany ............................. | 277/27 |

Primary Examiner—Harry N. Haroian
Attorney, Agent, or Firm—Michael S. Striker

[57] ABSTRACT

A hydrostatic shaft seal wherein the shaft carries a first sealing ring and the housing which surrounds the shaft contains an axially movable second sealing ring. The rings define an annular gap for the leakage of fluid from a pressure chamber into a low-pressure area surrounding the periphery of the shaft. That surface of the first ring which flanks the gap is normal to the axis of the shaft, and the corresponding surface of the second ring is at least partially convex with radii of curvature which diminish in a direction from the low-pressure area toward the chamber. The innermost portion of the convex surface can be made concave with a gradual transition into the convex portion.

8 Claims, 2 Drawing Figures

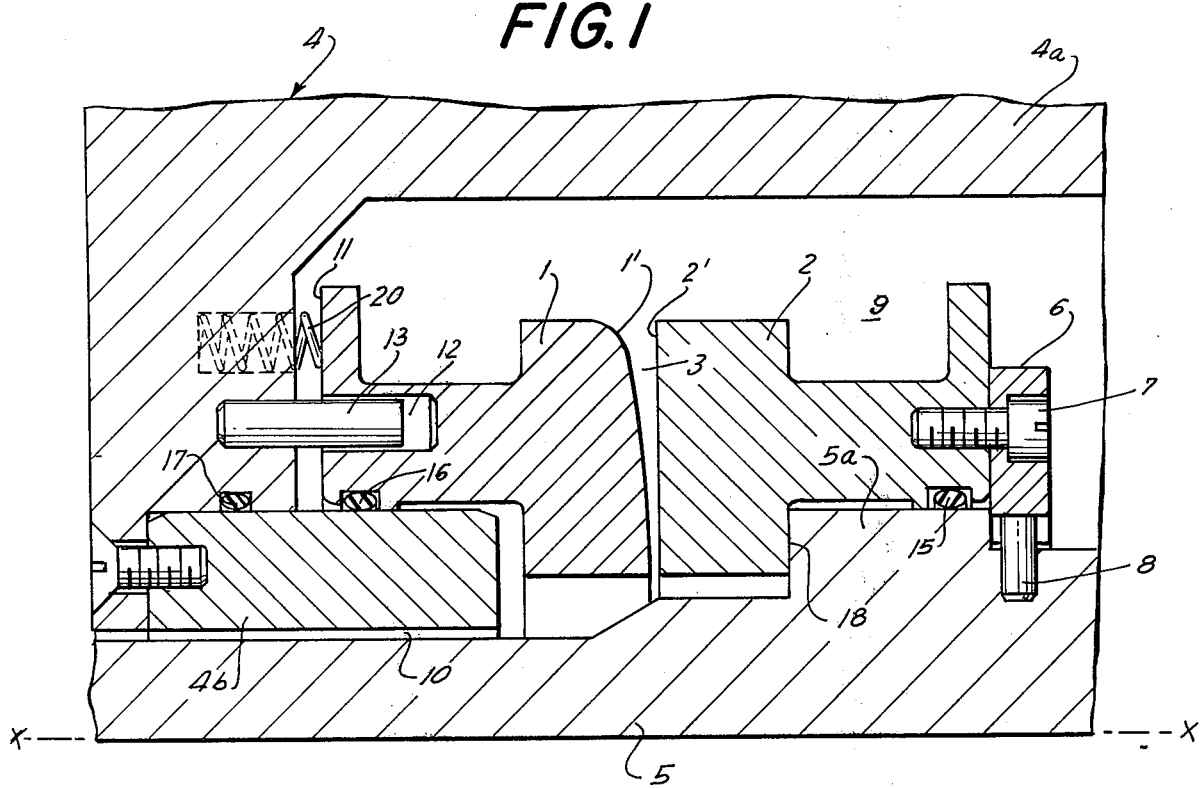

SHAFT SEAL LIFT-OFF ARRANGEMENT

BACKGROUND OF THE INVENTION

The present invention relates to hydrostatic seals in general, and more particularly to improvements in fluid seals of the type known as shaft seal lift-off arrangements. Such hydrostatic seals are often used to control the leakage of fluid from a pressure chamber to a low-pressure area, for example, in pumps which are used in nuclear reactor plants and wherein contaminated liquid leaks along the periphery of a shaft which rotates in a stationary housing.

German Auslegeschrift No. 1,650,061 discloses hydrostatic shaft seals wherein the shaft carries a first sealing ring and the housing contains an axially movable second sealing ring which defines with the first ring an annular gap for the flow of leak fluid from a pressure chamber into a low-pressure area adjacent to the periphery of the shaft. The gap is flanked by two parallel surfaces, by two mutually inclined surfaces, by surfaces which are in part parallel with and in part inclined relative to each other, by parallel surfaces one of which has a pronounced ring-shaped rib or by mutually inclined surfaces one of which has a ring-shaped rib. It is also known to construct a hydrostatic seal in the form of a so-called pocket seal.

All of the just enumerated seals exhibit one or more serious drawbacks. For example, sealing rings with parallel surfaces tend to adhere to each other when the fluid pressure in the gap decreases as well as during the initial stage of fluid pressure rise in the chamber. Surfaces which are provided with ribs tend to accumulate particles of solid impurities to thereby negatively affect the degree of balance and hence the stiffness of the seal. The stiffness of a hydrostatic seal is determined by the changes in opening forces as a function of changes in the width of the gap. A drawback of a hydrostatic seal wherein the width of the gap varies gradually all the way from the pressure chamber to the low-pressure area is that the seal is overly sensitive to wear on the surfaces which flank the gap, i.e., the degree of balance changes excessively and unpredictably in response to wear on such surfaces.

All of the above enumerated conventional seals exhibit the additional drawback that the initial wear takes place in those regions of the gap which are most likely to undergo additional wear when the basic configuration of surfaces which are adjacent to the gap changes under the abrasive influence of solid particles in the gap.

SUMMARY OF THE INVENTION

An object of the invention is to provide a novel and improved fluid seal arrangement wherein the influence of wear upon the surfaces which flank the gap can be calculated in advance and wherein changes in the degree of balance initiate the generation of additional opening forces.

Another object of the invention is to provide a hydrostatic shaft seal which is more reliable than heretofore known seals and wherein the penetration of solid impurities into the gap cannot cause uncontrollable changes in hydraulic values.

A further object of the invention is to provide novel sealing rings for use in the improved hydrostatic seal.

An additional object of the invention is to provide a hydrostatic seal wherein the surfaces which flank the gap cannot adhere to each other and which can be used as a simpler, less expensive, longer lasting and more reliable substitute for conventional seals.

The invention is embodied in a fluid seal arrangement which comprises a shaft member, a housing member which spacedly surrounds the shaft member and defines therewith a fluid-containing pressure chamber and a low-pressure area adjacent to the periphery of the shaft member, means for rotating the shaft member relative to the housing member or vice versa, and first and second sealing rings which are located in the pressure chamber and are respectively secured to the shaft member and housing member. One of the sealing rings is movable axially of the shaft member and the sealing rings have neighboring first surfaces which define an annular gap for the flow of leak fluid from the pressure chamber into the low-pressure area. The axially movable sealing ring is further provided with a second surface which faces away from the respective first surface and is exposed to fluid pressure in the chamber.

In accordance with a feature of the invention, at least a portion of one of the first surfaces has a convex outline with radii of curvature which diminish in a direction from the low-pressure area toward the pressure chamber, i.e., radially of and away from the axis of the shaft member.

The just mentioned convex portion can constitute the entire first surface of the respective sealing ring or only the outer portion of such first surface; in the latter case, the other or inner portion of the first surface has a concave outline and merges gradually into the convex portion. The other first surface is preferably located in a plane which is normal to the axis of the shaft member.

The novel features which are considered as characteristic of the invention are set forth in particular in the appended claims. The improved fluid seal arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

FIG. 1 is a fragmentary axial sectional view of a fluid seal arrangement which embodies one form of the invention; and FIG. 2 is a fragmentary axial sectional view of the sealing rings in a modified fluid seal arrangement.

DESCRIPTION OF THE PREFERRED EMBODIMENTS

Referring first to FIG. 1, there is shown a fluid seal arrangement which comprises a rotary shaft 5, a stationary pump housing 4, and two coaxial sealing rings 1, 2. The sealing rings 1, 2 define an annular gap 3 wherein a fluid can leak from a pressure chamber 9 into a low-pressure area 10 surrounding the periphery of the shaft 5. The housing 4 comprises a main portion 5a and a cylindrical portion 4b which is secured to the main portion 4a by one or more screws 14 or analogous fasteners.

The sealing ring 2 is secured to the shaft 5 in which a way that it shares all angular movements of the shaft and is held against axial movement toward or away from the sealing ring 1. The shaft 5 has a ring-shaped collar 5a one end face of which abuts against a face 18 of the sealing ring 2 and the other end face of which abuts against a ring-shaped connector 6 which is affixed to the sealing ring 2 by one or more screws or analogous fasteners 7. The connector 6 is held against rotation relative to the shaft 5 by one or more radially extending pins 8.

The sealing ring 1 is movable axially of the shaft 5 and has a surface 11 which faces away from the gap 3 and is exposed to fluid pressure in the chamber 9. The surface 11 is formed with one or more axially parallel blind bores 12 for guide posts 13 which are anchored in the main housing portion 4a.

A first gasket 15 is interposed between the collar 5a and the sealing ring 2, and a second gasket 17 is interposed between the housing portions 4a, 4b. A packing 16 is compressed between the axially movable sealing ring 1 and the housing portion 4b. One or more weak helical springs 20 react against the housing 4 and bias the ring 1 toward the ring 2 to close the gap 3 when the fluid pressure in the chamber 9 decreases to a predetermined value.

The inner and outer diameters of the ring 2 in the region of the gap 3 are identical with the respective diameters of the ring 1.

In accordance with a feature of the invention, the width of the gap 3 which is defined by the neighboring surfaces 1', 2' of the sealing rings 1, 2 diminishes gradually toward the axis X—X of the shaft 5, i.e., from the pressure chamber 9 toward the low-pressure area 10. The surface 2' is located in a plane which is normal to the axis X—X and the surface 1' is a convex surface with radii of curvature which diminish in a direction from the low-pressure area 10 toward the pressure chamber 9, i.e., radially of and away from the axis X—X of the shaft 5. The decrease in width of the gap 3 is less pronounced in the region close to the axis X—X of the shaft 5 and more pronounced at the outer end which communicates with the pressure chamber 9.

The fluid seal arrangement of FIG. 1 exhibits the important advantage that its function is not affected by incipient or progressing wear upon the surface 1' and/or 2'. The changes in hydraulic values become felt only in response to very pronounced wear on such surfaces.

FIG. 2 illustrates the sealing rings 2 and 101 of a modified fluid seal arrangement. The configuration of the surface 2' on the sealing ring 2 is identical with that of the similarly referenced surface in FIG. 1. However, the surface 1'' of the sealing ring 101 includes an outer portion 1A'' which has a convex outline and an inner portion 1B'' having a concave outline and merging gradually into the convex portion /A''. The radii of curvature of successive increments of the surface portion 1A'' decreases gradually in a direction from the surface portion 1B'' toward the pressure chamber. In this embodiment, the decrease in width of the gap 103 is less pronounced in the region of the inner end of the gap and more pronounced in the region of the outer end of the gap.

An advantage of a fluid seal arrangement which embodies the sealing rings 101, 2 of FIG. 2 is that the opening force increases in response to contamination so that the width of the gap 103 increases with the result that the particles of foreign matter are flushed out into the low-pressure area by fluid which leaks from the pressure chamber. This is due to the fact that solid impurities tend to accumulate in the inner portion of the gap 103 (in the region of the concave surface portion 1B'') and thereby obstruct the flow of fluid into the low-pressure area. Such throttling action brings about a rise of average fluid pressure in the gap 103 and results in axial movement of the ring 101 away from the ring 2.

The fluid seal arrangement of the present invention can be used with advantage in coolant circulating pumps of pressure- and boiling water-reactor plants. However, it is clear that this arrangement can find use in other types of apparatus wherein it is desired or necessary to establish and maintain a controlled leakage of fluid from a pressure chamber into a low-pressure area, e.g., in all or nearly all types of high-pressure pumps. The arrangement is normally used to control the leakage of fluid in the region where the shaft extends from the pump housing or body.

When the fluid seal arrangement is in use, the surface 11 of the axially movable sealing ring 1 or 101 is subjected to full system pressure in the chamber 9. The forces acting upon the surface 11 tend to close the gap 3 or 103 and are opposed and balanced by opening forces in the gap. The magnitude of opening forces decreases in a direction from the outer end toward the inner end of the gap 3 or 103, i.e., toward the axis X—X of the shaft 5. If the width of the gap 3 or 103 increases due to external influences, the closing force prevails and the width of the gap decreases. If the width of the gap 3 or 103 increases due to external influences, the closing force prevails and the width of the gap decreases. If the width of the gap decreases below its average or normal width, the opening force prevails and the width of the gap increases. The distribution of pressures in the gap as a function of the width of the gap can be calculated on the basis of the Navier-Stokes differential equation.

The improved fluid seal arrangement is susceptible of many additional modifications. Thus, the housing 4 can rotate relative to the shaft 5, the sealing ring 2 can be mounted for axial movement relative to the sealing ring 1 or 101, and/or the surface 1' or 1'' can be provided on the sealing ring 2. The ring 2 can be made integral with the shaft 5.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a fluid seal arrangement, the combination of a shaft member; a housing member spacedly surrounding said shaft member and defining therewith a fluid-containing pressure chamber and a low-pressure area adjacent to the periphery of said shaft member, one of said members being rotatable about the axis of said shaft member; and first and second sealing rings located in said pressure chamber and respectively secured to said shaft member and said housing member, one of said rings being movable axially of said shaft member and said rings having neighboring first surfaces defining an annular gap for the leakage of fluid from said chamber into said area, said one ring further having a second surface facing away from the respective first surface and exposed to fluid pressure in said chamber, the width of said gap decreasing in a direction from said pressure chamber toward said low-pressure area and the radially outwardly located portion of said first surface of one of said sealing rings having a convex outline with radii of curvature which diminish in a direction from said low-pressure area toward said pressure chamber and the radially inwardly located portion of said first surface of said one of said sealing rings having a concave outline, said radially outwardly located convex portion and said radially inwardly located concave portion of said first surface smoothly merging into each other.

2. The combination of claim 1, wherein said shaft member is rotatable in said housing member and said second sealing ring is movable axially of said shaft member, said first surface of said first sealing ring being normal to the axis of said shaft member and said portion of convex outline forming part of said first surface of said second sealing ring.

3. The combination of claim 2, wherein the decrease in width of said gap is more pronounced in the proximity of said chamber and less pronounced in the proximity of said low-pressure area.

4. The combination of claim 1, wherein said sealing rings have identical inner and outer diameters in the region of said gap.

5. The combination of claim 1, further comprising a packing interposed between said one sealing ring and the respective one of said members.

6. The combination of claim 1, further comprising a gasket interposed between the other of said sealing rings and the respective one of said members.

7. The combination of claim 1, further comprising means for separably connecting the other of said sealing rings to the respective one of said members.

8. The combination of claim 1, further comprising means for yieldably biasing said one sealing ring toward the other of said rings.

* * * * *